United States Patent
Gomez Martinez

(10) Patent No.: US 9,729,296 B2
(45) Date of Patent: Aug. 8, 2017

(54) NON-CONVEX OPTIMIZATION OF RESOURCE ALLOCATION IN MULTI-USER NETWORKS WITH TIME-VARIANT CAPACITY

(71) Applicant: MARVELL WORLD TRADE LTD., Barbados (BB)

(72) Inventor: Feliciano Gomez Martinez, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 227 days.

(21) Appl. No.: 14/282,804

(22) Filed: May 20, 2014

(65) Prior Publication Data

US 2014/0348139 A1   Nov. 27, 2014

Related U.S. Application Data

(60) Provisional application No. 61/825,685, filed on May 21, 2013.

(51) Int. Cl.
*H04W 74/04* (2009.01)
*H04L 5/00* (2006.01)
(Continued)

(52) U.S. Cl.
CPC .......... *H04L 5/0053* (2013.01); *H04L 5/0064* (2013.01); *H04L 47/781* (2013.01);
(Continued)

(58) Field of Classification Search
CPC ............ H04L 41/0806; H04L 41/0886; H04L 41/0896; H04L 43/00; H04L 45/02;
(Continued)

(56) References Cited

U.S. PATENT DOCUMENTS 7,403,988 B1 * 7/2008 Blouin ................ H04L 12/2602
370/230
9,326,161 B2 * 4/2016 Wang .................... H04W 24/02
(Continued)

FOREIGN PATENT DOCUMENTS

WO    WO-2012/162576 A1    11/2012

OTHER PUBLICATIONS

International Search Report and Written Opinion of International Application No. PCT/US2014/038820, dated Nov. 14, 2014 (16 pages).

(Continued)

*Primary Examiner* — Raj Jain

(57) ABSTRACT

A plurality of resource requests and a plurality of estimated link capacities are received at a first device from other devices coupled to a network. Each of the plurality of resource requests is indicative of a requested data rate for a different one of a plurality of communication links. Each of the plurality of estimated link capacities is indicative of an available data rate for the different ones of the plurality of communication links. An allocation of time slots within a first time interval is determined at the first device, based on at least the plurality of resource requests and the plurality of estimated link capacities, according to a branch and bound algorithm. At least some of the other devices of the plurality of devices are caused to communicate via the plurality of communication links according to the determined allocation of time slots.

16 Claims, 6 Drawing Sheets

(51) Int. Cl.
  H04L 12/911    (2013.01)
  H04W 72/04     (2009.01)
  H04L 12/721    (2013.01)
(52) U.S. Cl.
  CPC .......... *H04L 47/823* (2013.01); *H04L 47/826* (2013.01); *H04W 74/04* (2013.01); *H04L 45/123* (2013.01); *H04W 72/0446* (2013.01)
(58) Field of Classification Search
  CPC .. H04L 45/123; H04L 63/08; H04W 72/0446; H04W 74/04
  See application file for complete search history.

(56) References Cited

U.S. PATENT DOCUMENTS

| | | | | |
|---|---|---|---|---|
| 2004/0013089 | A1* | 1/2004 | Taneja | H04L 12/5695 370/235 |
| 2004/0028018 | A1* | 2/2004 | Cain | H04B 7/2643 370/338 |
| 2008/0080545 | A1* | 4/2008 | Wong | H04L 27/2608 370/437 |
| 2011/0126067 | A1* | 5/2011 | Rezk | H04L 1/0046 714/748 |
| 2014/0348139 | A1* | 11/2014 | Gomez Martinez | H04L 5/0053 370/336 |

OTHER PUBLICATIONS

International Preliminary Report on Patentability in International Application No. PCT/US2014/038820, mailed Dec. 3, 2015 (12 pages).
ITU-T Recommendation G.9960, "Unified high-speed wireline-based home networking transceivers—System architecture and physical layer specification," *Int'l Telecommunication Union*, pp. 1-160 (Dec. 2011).
ITU-T Recommendation G.9960, Erratum 1 to Recommendation ITU-T G.9960, *Int'l Telecommunication Union*, 1 page (Jul. 2012).
ITU-T Recommendation G.9960, Erratum 2 to Recommendation ITU-T G.9960, *Int'l Telecommunication Union*, 4 pages (Sep. 2012).
ITU-T Recommendation G.9961, "Unified high-speed wire-line based home networking transceivers—Data link layer specification," *Int'l Telecommunication Union*, pp. 1-220 (Jun. 2010).
ITU-T Recommendation G.9961, Corrigendum 1, "Unified high-speed wire-line based home networking transceivers—Data link layer specification," *Int'l Telecommunication Union*, pp. 1-158 (Dec. 2011).
ITU-T Recommendation G.9961, Amendment 1, "Unified high-speed wire-line based home networking transceivers—Data link layer specification," *Int'l Telecommunication Union*, pp. 1-80 (Sep. 2012).
ITU-T Recommendation G.9961, Corrigendum 2, "Unified high-speed wire-line based home networking transceivers—Data link layer specification," *Int'l Telecommunication Union*, pp. 1-122 (Jul. 2013).
ITU-T Recommendation G.9961, Amendment 2, "Unified high-speed wire-line based home networking transceivers—Data link layer specification," *Int'l Telecommunication Union*, pp. 1-44 (Apr. 2014).
ITU-T Recommendation G.9963, "Unified high-speed wireline-based home networking transceivers—Multiple input-multiple output specification" *Int'l Telecommunication Union*, pp. 1-90 (Dec. 2011).
Boyd et al., "Convex Optimization," *Cambridge University Press*, pp. 1-728 (2004).
Brown, "G.hn: Draft text for G.9960 (2010) corrigendum 1," *International Telecommunication Union*, pp. 1-184 (Feb. 2011).
Brown, "G.hn: Draft text for G.9961 (2010) corrigendum 1," *International Telecommunication Union*, pp. 1-282 (Feb. 2011).
Clausen, "Branch and Bound Algorithms—Principles and Examples," Department of Computer Science, University of Copenhagen, pp. 1-30 (Mar. 12, 1999).
Land et al., "An Automatic Method of Solving Discrete Programming Problems," *Econometrica*, vol. 28, No. 3, pp. 497-520 (Jul. 1960).
Lin et al., "Optimal and Near-Optimal Resource allocation Algorithms for OFDMA Networks," *IEEE Transactions on Wireless Communications*, vol. 8, No. 8, pp. 4066-4077 (Aug. 2009).
Invitation to Pay Additional Fees and Partial International Search Report for corresponding PCT/US2014/038820, dated Aug. 29, 2014 (7 pages).
IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," *The Institute of Electrical and Electronics Engineers, Inc.*, pp. 1-292 (Apr. 1, 2003).
IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, 893 pages (Oct. 1, 2004).
IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).
IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).
IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).
IEEE 802.20-PD-06; IEEE P 802.20TMV14, Draft 802.20 Permanent Document; <System Requirements for IEEE 802.20 Mobile Broadband Wireless Access Systems—Version 14>, 24 pages (Jul. 16, 2004).
Ansari, et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).
IEEE Std 802.16j (Amendment to IEEE Std 802.16-2009), "IEEE Standard for Local and metropolitan area networks: Part 16: Air Interface for Broadband Wireless Access Systems—Amendment 1: Multihop Relay Specification," *The Institute of Electrical and Electronics Engineers, Inc.*, pp. 1-315 (Jun. 12, 2009).

* cited by examiner

NON-CONVEX OPTIMIZATION OF RESOURCE ALLOCATION IN MULTI-USER NETWORKS WITH TIME-VARIANT CAPACITY

CROSS-REFERENCES TO RELATED APPLICATIONS

This application claims the benefit of U.S. Provisional Patent Application No. 61/825,685, entitled "Non-Convex Optimization Methods for Optimal Allocation of Resources in Multiuser Networks with Time-Variant Capacity" and filed on May 21, 2013, the disclosure of which is incorporated herein by reference.

FIELD OF THE DISCLOSURE

The present disclosure relates generally to communication networks and, more particularly, to allocation of resources (also referred to herein as "resource allocation") in multi-user networks.

BACKGROUND

Recently, a number of technologies have been introduced to provide high-speed transmission of multimedia data over existing wires within the home, such as power wires, coaxial cables, and phone lines. One such technology is the "G.hn" standard developed by the Telecommunication Standardization Sector of the International Telecommunications Union (ITU-T). In order to satisfy the quality of service (QoS) requirements of video delivery applications, the G.hn standard supports a number of features, such as centralized control of access to the communication medium (wire/line) and the ability to handle time-variant line rates between devices/nodes.

Efficient allocation of resources (e.g., access to the shared wire/line) for multi-user networks with time-varying channel capacity can be a complex problem, particularly as the number of devices/nodes increases. Current solutions use convex "optimization" techniques to allocate resources. Such techniques, however, are based on simplified models that ignore transmission overhead, such as preambles, headers, interframe gaps (IFGs), acknowledgments (ACKs), ACK interframe gaps (AIFGs), etc. In real-world applications that include such overhead, these techniques generally fail to provide an optimal solution/allocation.

SUMMARY

In an embodiment, a method of allocating resources is implemented in a first device of a plurality of devices coupled to a network. The method includes receiving, at the first device and from other devices of the plurality of devices, a plurality of resource requests, wherein each of the plurality of resource requests is indicative of a requested data rate for a different one of a plurality of communication links, and wherein each of the plurality of communication links is associated with a respective pair of devices within the plurality of devices; receiving, at the first device and from the other devices of the plurality of devices, a plurality of estimated link capacities, wherein each of the plurality of estimated link capacities is indicative of an available data rate for the different ones of the plurality of communication links; determining, at the first device and based on at least the plurality of resource requests and the plurality of estimated link capacities, an allocation of time slots within a first time interval according to a branch and bound algorithm, wherein the allocation of time slots reserves different segments of the first time interval for use by different communication links of the plurality of communication links; and causing at least some of the other devices of the plurality of devices to communicate via the plurality of communication links according to the determined allocation of time slots.

In another embodiment, a device comprises a network interface configured to receive, from other devices of a plurality of devices coupled to a network, a plurality of resource requests and a plurality of estimated link capacities, wherein each of the plurality of resource requests is indicative of a requested data rate for a different one of a plurality of communication links, and wherein each of the plurality of communication links is associated with a respective pair of devices within the plurality of devices, and wherein each of the plurality of estimated link capacities is indicative of an available data rate for the different ones of the plurality of communication links; and a scheduling unit configured to determine, based on at least the plurality of resource requests and the plurality of estimated link capacities, an allocation of time slots within a first time interval according to a branch and bound algorithm, wherein the allocation of time slots reserves different segments of the first time interval for use by different communication links of the plurality of communication links, and cause at least some of the other devices of the plurality of devices to communicate via the plurality of communication links according to the determined allocation of time slots.

In yet another embodiment, a method of allocating resources is implemented in a first device of a plurality of devices coupled to a network. The method includes: receiving, at the first device and from other devices of the plurality of devices, a plurality of resource requests, wherein each of the plurality of resource requests is indicative of a requested data rate for a different one of a plurality of communication links, and wherein each of the plurality of communication links is associated with a respective pair of devices within the plurality of devices; receiving, at the first device and from the other devices of the plurality of devices, a plurality of estimated link capacities, wherein each of the plurality of estimated link capacities is indicative of an available data rate for the different ones of the plurality of communication links; determining, at the first device and based on at least (i) the plurality of resource requests, (ii) the plurality of estimated link capacities, and (iii) a cost associated with a sub-optimal allocation of time slots within a first time interval, an allocation of time slots within the first time interval according to an optimizing algorithm while accounting for overhead associated with data communicated on the plurality of communication links, wherein the allocation of time slots reserves different segments of the first time interval for use by different communication links of the plurality of communication links; and causing at least some of the other devices of the plurality of devices to communicate via the plurality of communication links according to the determined allocation of time slots.

In still another embodiment, a device comprises: a network interface configured to receive, from other devices of a plurality of devices coupled to a network, a plurality of resource requests and a plurality of estimated link capacities, wherein each of the plurality of resource requests is indicative of a requested data rate for a different one of a plurality of communication links, and wherein each of the plurality of communication links is associated with a respective pair of devices within the plurality of devices, and wherein each of the plurality of estimated link capacities is indicative of an available data rate for the different ones of the plurality of communication links; and a scheduling unit configured to determine, based on at least (i) the plurality of resource requests, (ii) the plurality of estimated link capacities, and (iii) a cost associated with a sub-optimal allocation of time slots within a first time interval, an allocation of time slots within the first time interval according to an optimizing algorithm while accounting for overhead associated with data communicated on the plurality of communication links, wherein the allocation of time slots reserves different segments of the first time interval for use by different communication links of the plurality of communication links, and cause at least some of the other devices of the plurality of devices to communicate via the plurality of communication links according to the determined allocation of time slots.

DETAILED DESCRIPTION

In embodiments described below, resources (e.g., time slots for accessing a shared medium) are allocated in multi-user networks with time-varying channel capacities. In some embodiments, an optimal allocation of resources is achieved even in the presence of transmission overhead. In one such embodiment, a "branch and bound" technique is used to find, for a given set of problem inputs (e.g., a number of resource requests, estimated link capacities associated with the requests, etc.), a mathematically optimal solution over a non-convex solution region. In an embodiment, the branch and bound technique will find the optimal solution so long as at least one solution exists. In some embodiments, one or more heuristic techniques are also used to quickly determine one or more sub-optimal solutions at a first stage, and the optimal solution is determined at a second stage. In various embodiments, the "cost" of the best (or only) sub-optimal solution is used to limit the number of problems to be solved using the branch and bound algorithm. In some embodiments, the best (or only) sub-optimal solution is implemented as an interim solution until the optimal solution has been determined.

Figure 1:
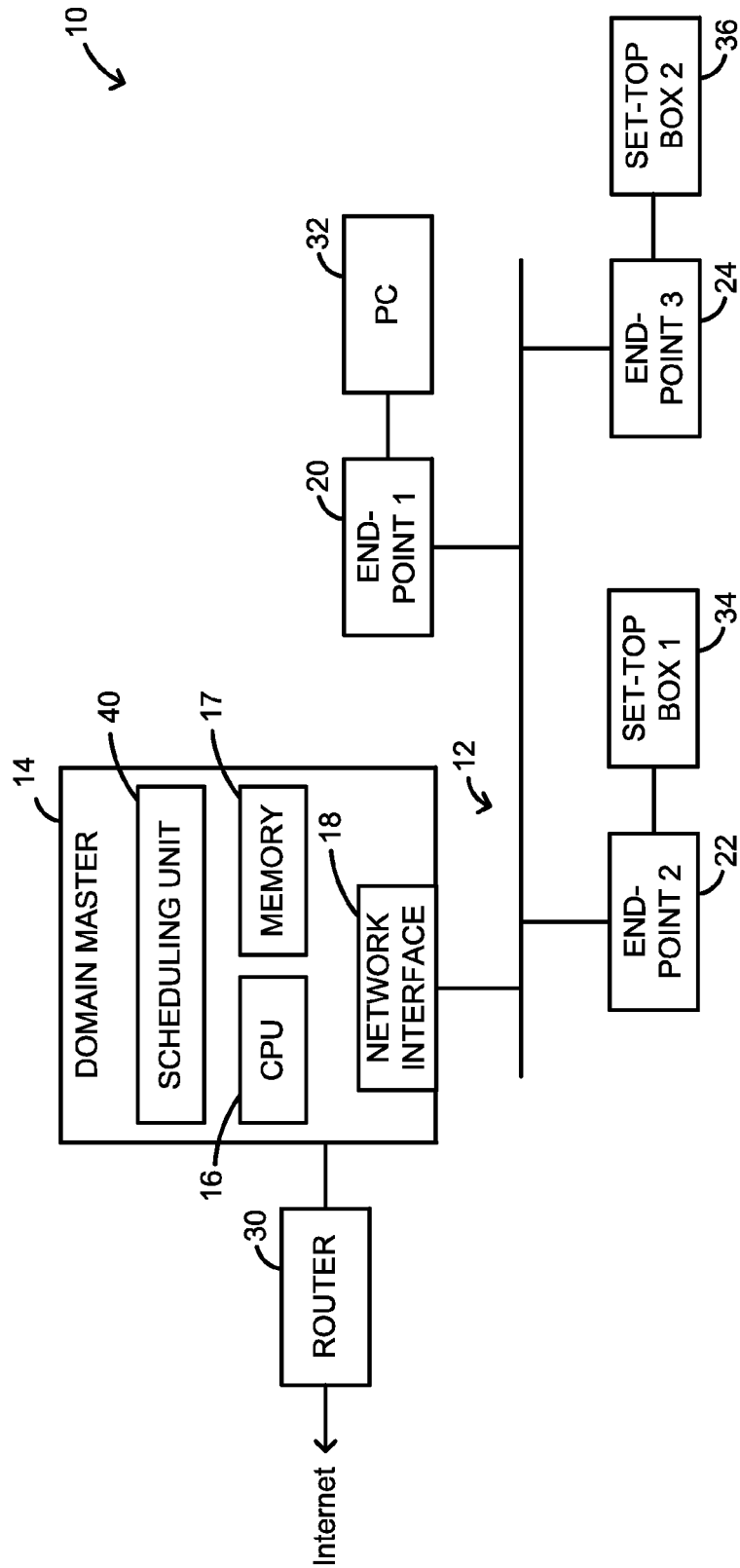
FIG. 1 is a block diagram illustrating an example network in which resource allocation techniques of the present disclosure may be implemented, according to an embodiment.

FIG. 1 is a block diagram of an example network 10 in which resource allocation techniques of the present disclosure may be implemented, according to an embodiment. The network 10 includes a physical communication medium ("shared medium") 12 that is shared by multiple nodes or devices. In the example shown in FIG. 1, the devices include a domain master device (DM) 14, a first endpoint device (EP1) 20, a second endpoint device (EP2) 22, and a third endpoint device (EP3) 24. The domain master device 14 and endpoint devices 20, 22, and 24 are implemented as stand-alone electronic devices, network interface cards, integrated circuits or "chips," one or more chip sets, or other suitable devices, in various embodiments. One or more portions of the devices are implemented as hardware (e.g., a processor or memory), firmware and/or software executed by one or more processor devices, or any suitable combination thereof, in various embodiments. While only endpoint devices 20, 22, and 24 are shown for clarity, other embodiments of the network 10 have a suitable number of additional endpoint devices or fewer endpoint devices. The domain master device 14 is a device dedicated to manage the communications over the network 10, in an embodiment, or simply another instance of an endpoint device that has been selected or configured to manage the communications, in another embodiment.

The shared medium 12 includes electrical power wires, coaxial wires, telephone wires, or other suitable wires or communication media within a home, commercial building, or other space, in various embodiments. The shared medium 12 is shown with only a single line for clarity, but may have two or more physical lines or conductors in various embodiments. The domain master device 14 and endpoint devices 20, 22, and 24 in one illustrative example communicate over the network 10 according to G.hn standards and protocols, as described in International Telecommunication Union Telecommunication (ITU-T) Recommendation G.9960 and G.9961, according to an embodiment. However, other suitable communication protocols are utilized in other embodiments.

The domain master device 14 includes a processor (CPU) 16, a memory 17, and a network interface 18, in an embodiment. The network interface is configured to receive resource requests from the endpoint devices of the network 10. In the example embodiment of FIG. 1, the domain master device 14 is also coupled to, or includes, a router 30 that provides a gateway or interface to another network (not shown), such as to a local area network (LAN), a Wi-Fi or wireless LAN network (WLAN), a WiMAX network, a wide area network (WAN), the Internet, or other suitable wired or wireless networks. The router 30 is coupled to and provides access to a suitable communication network such as a fiber channel network, a cable television (CATV) data network, or other suitable high speed networks, in various embodiments. The first endpoint device 20 is coupled to, or is included within, a personal computer (PC) 32 or other suitable network-enabled consumer electronic devices (e.g., a laptop computer, a workstation, a network-attached storage (NAS) device, a video game controller, a set-top box, etc.), in various embodiments. The endpoint devices 22 and 24 are coupled to, or are included within, a set-top box 34 and a set-top box 36, respectively. Other suitable electronic devices (e.g., consumer electronic devices, home security devices, smart home devices, appliances, etc.) may be coupled to (or may include) the endpoint devices 22 and 24 in other embodiments. In some embodiments, an endpoint device is integral with (e.g., a component of) an electronic device.

In an embodiment, communications on the shared medium 12 are at least partially managed or scheduled by the domain master device 14. To this end, domain master device 14 includes a scheduling unit (SU) 40. The scheduling unit 40 can be implemented as hardware, firmware and/or software executed by a processor, or any combination thereof, in various embodiments. The communications may include data communications (e.g., Internet traffic), video communications (e.g., streaming video), audio communications (e.g., audio playback to a receiver, streaming audio, etc.), telephony communications, etc., in various embodiments. For example, a user of the set-top box 34 may watch a television program that is streamed from the Internet, via the router 30, the domain master device 14, and the second endpoint device 22. In another example, a user of the PC 32 may view various websites that are downloaded via the router 30, the domain master device 14, and the first endpoint device 20. The communications need not be provided through the domain master device 14 or router 30. In one example, the set-top box 36 includes a digital video recording (DVR) capability that stores recorded video content. In this case, a user may view the recorded video content from the PC 32, via the first endpoint device 20 and third endpoint device 24. In other embodiments and/or scenarios, other suitable variations of communications over the shared medium 12 are performed.

The scheduling unit 40 is configured to allocate time slots, or segments thereof, for the endpoint devices 20, 22, and 24 to access the shared medium 12. To allocate the time slots, in an embodiment, the domain master device 14 generates and sends a scheduling message, such as a medium access plan (MAP) message, to one or more of the endpoint devices 20, 22, and 24. The scheduling message in one embodiment includes a start time and a duration for a segment of a time slot in which an endpoint should transmit data on the shared medium 12. In other embodiments, the scheduling message indicates a start time and an end time. In still other embodiments, the time slots are indicated to the endpoints and the scheduling message includes an indicator of which time slot should be used. In some embodiments, the domain master device 14 determines and distributes the allocation (e.g., via the scheduling messages) to the endpoint devices 20, 22, and 24 periodically. In one embodiment in which the shared medium 12 is an electrical power line, for example, domain master device 14 generates and sends the scheduling message in synchronization with the power cycle, such as once per power cycle (e.g., once per 20 milliseconds for a 50 Hz power cycle), once every 2 power cycles (e.g., once every 40 milliseconds), or other integer multiple of the power cycle.

Figure 2:
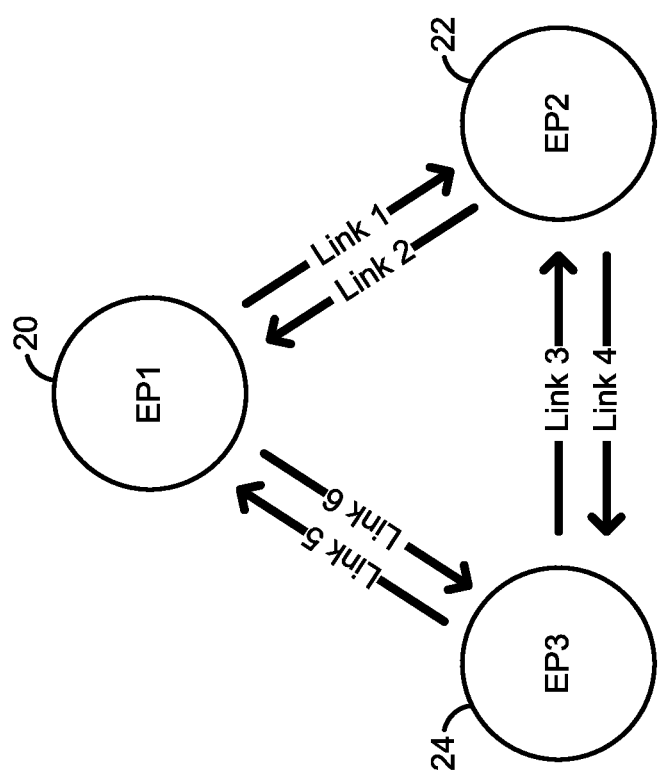
FIG. 2 is a block diagram showing unidirectional communication links between endpoint devices in the network of FIG. 1, according to an embodiment.

FIG. 2 is a block diagram showing unidirectional links between endpoint devices 20, 22, 24 in the example network 10 of FIG. 1, according to an embodiment. The various links are denoted as "Link 1" through "Link 6" (e.g., Link 1 corresponding to communications from first endpoint device 20 to second endpoint device 22, Link 2 corresponding to communications from second endpoint device 22 to first endpoint device 20, etc.) for ease of reference in the description below. In other embodiment or scenarios, one or more of Links 1 through 6 may be omitted or inactive. In other embodiments or scenarios, the two links between each pair of endpoints can be represented as a single bi-directional link (e.g., in embodiments where there is substantially equal noise or interference in each direction and each pair of endpoints determines access locally).

The Links 1 through 6 are illustrated as separate "logical" links but correspond to a same, shared physical link (i.e., the shared medium 12), thus only one of Links 1 through 6 can be active during a given time slot without interference or data collisions, in some embodiments. Additionally, while Links 1 through 6 are shown as between the endpoint devices 20, 22, and 24, other links can be provided, such as from the domain master device 14 to an endpoint device or from the router 30 to an endpoint device.

Figure 3:
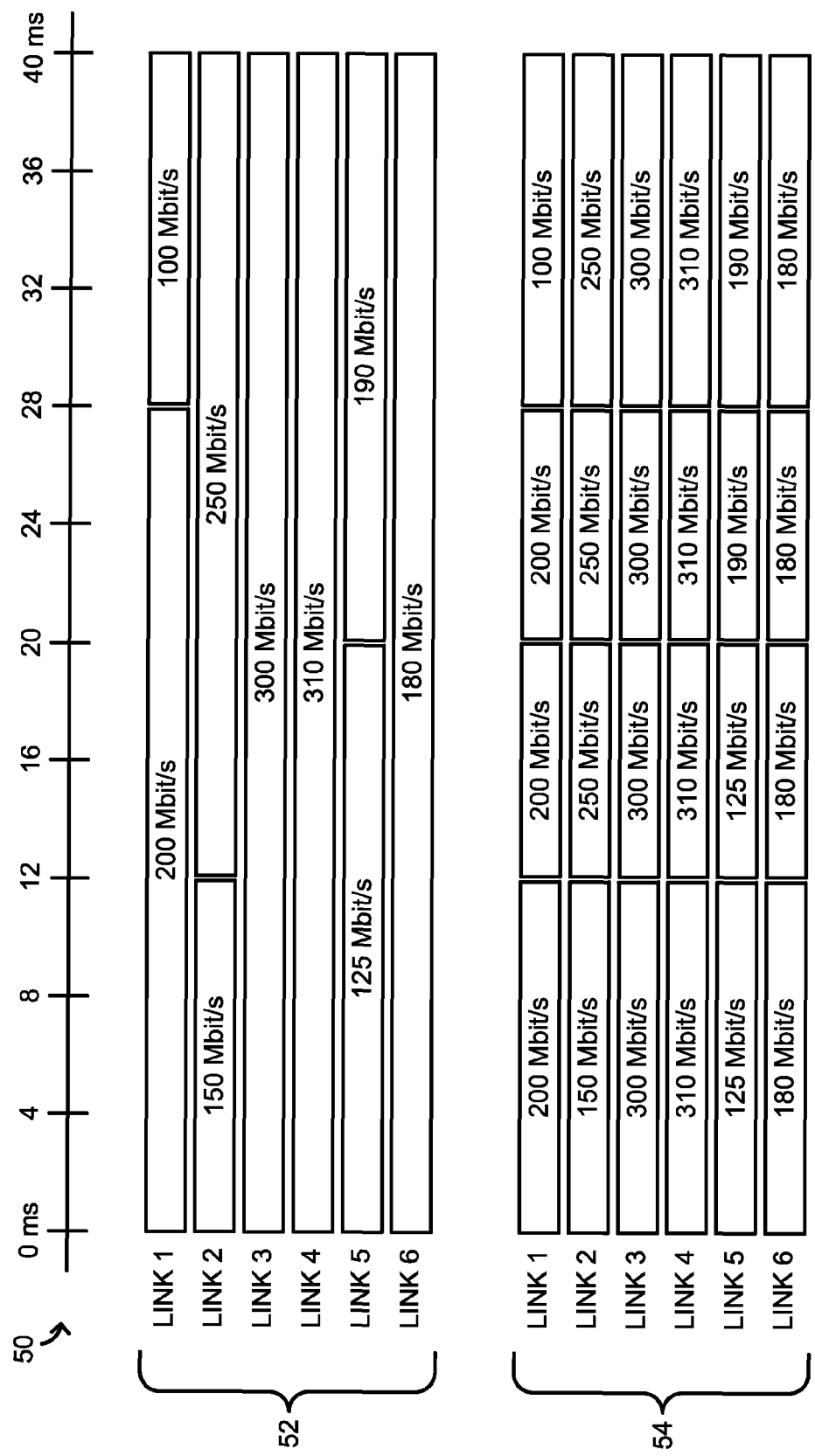
FIG. 3 is a diagram showing example capacities for the various communication links between the endpoint devices of FIG. 1, according to one embodiment and scenario.

FIG. 3 is a diagram showing example capacities for the various communication links shown in FIG. 2, according to one embodiment and scenario. In this scenario, the shared medium 12 is an electrical power line with a 50 Hz operating frequency. The domain master device 14 uses a time interval of 40 milliseconds to coincide with two cycles of the 50 Hz operating frequency, which helps to reduce the effects of noise on communications through the network 10, in an embodiment. Time interval 50 of FIG. 3 illustrates one instance of the 40 millisecond interval.

In an embodiment, the endpoint devices 20, 22, and 24 perform channel estimation for their respective links to help determine an estimated link capacity (e.g., physical data rates). In some embodiments, the channel estimation and/or physical data rates are determined based on signal to noise ratios (SNRs), signal to interference plus noise ratios (SINRs), or other suitable signal characteristics. Where the network 10 is a G.hn network, the endpoint devices 20, 22, and 24 perform channel estimation according to the G.hn protocols, in an embodiment. In this case, each pair of endpoint devices (e.g., a pair selected from endpoint devices 20, 22, and 24) performs a Channel Estimation protocol (See e.g., ITU-T G.9961) to determine a modulation scheme to be used between the pair of endpoint devices. Noise conditions in the shared medium 12 are not the same for all endpoint devices (e.g., at different locations along the shared medium 12) and may also change over time as electric devices receiving power from the shared medium 12 are turned on or off, thus the SNR and determined modulation scheme may be different for various links or at various times. In an electrical power line communications channel, noise is often synchronized with the alternating current cycle, with a frequency of 50 Hz or 60 Hz, depending on the country. Due in part to this synchronization, noise conditions and interference can be repetitive and thus predictable such that noise measurements during one cycle provide useful information for one or more subsequent cycles.

The G.hn standard allows for estimation of the SNR in different regions of the cycle, allowing the endpoint devices to adapt their modulation scheme to changing noise conditions. The modulation scheme corresponds to an estimated link capacity (e.g., an estimated maximum data transmission speed) for the link. As shown in FIG. 3, a plurality of estimated link capacities 52 illustrates transmission speeds for Links 1 through 6 during one time interval of 40 milliseconds. The estimated link capacities can be substantially constant during the time interval, such as for Links 3, 4, and 6, or time-varying, such as for Links 1, 2, and 5, in an embodiment. Where the estimated link capacity is time-varying, the time interval can be divided into regions or time slots with respective capacities per region, in an embodiment. As shown, Link 1 has a first region of 28 milliseconds, with an estimated link capacity of 200 Megabits per second (Mbps), and a second region of 12 milliseconds, with an estimated link capacity of 100 Mbps. The endpoint devices 20, 22, and 24 provide the plurality of estimated link capacities 52 to the domain master device 14 (e.g., using the G.hn standard). The domain master device 14 determines an allocation of network resources for the network 10 based on the plurality of estimated link capacities 52 and a plurality of resource requests from the endpoint devices 20, 22, and 24, such as described herein. The endpoint devices 20, 22, and 24 send their respective estimated link capacities to the domain master device 14 that indicate an available data rate, according to an embodiment. The endpoint devices 20, 22, and 24, according to various embodiments, send updates to the estimated link capacities as their respective capacities change, or alternatively, on a predetermined schedule.

In some embodiments, to reduce the complexity of determining the allocation, the domain master device 14 divides multiple (e.g., all) links into a same number, a same duration, and a same position of time regions (e.g., time slots) and thus determines time slots for a time interval. As shown in FIG. 3, a plurality of estimated link capacities 54 illustrates a common division of regions. In an embodiment, allocation of links comprises selecting region boundaries at one or more transitions in the link capacity at 52. For illustration purposes, the time interval 50 is shown divided into ten parts of 4 milliseconds per part, according to an embodiment. Transitions of estimated link capacities for the Links 1 through 6 occur at 12, 20, and 28 milliseconds, thus the domain master device 14 provides four regions per time interval, according to an embodiment. While the regions shown are of different durations, in some embodiments, regions of equal length are used, such as four regions of ten milliseconds each, or other suitable variations, according to various embodiments.

Figure 4:
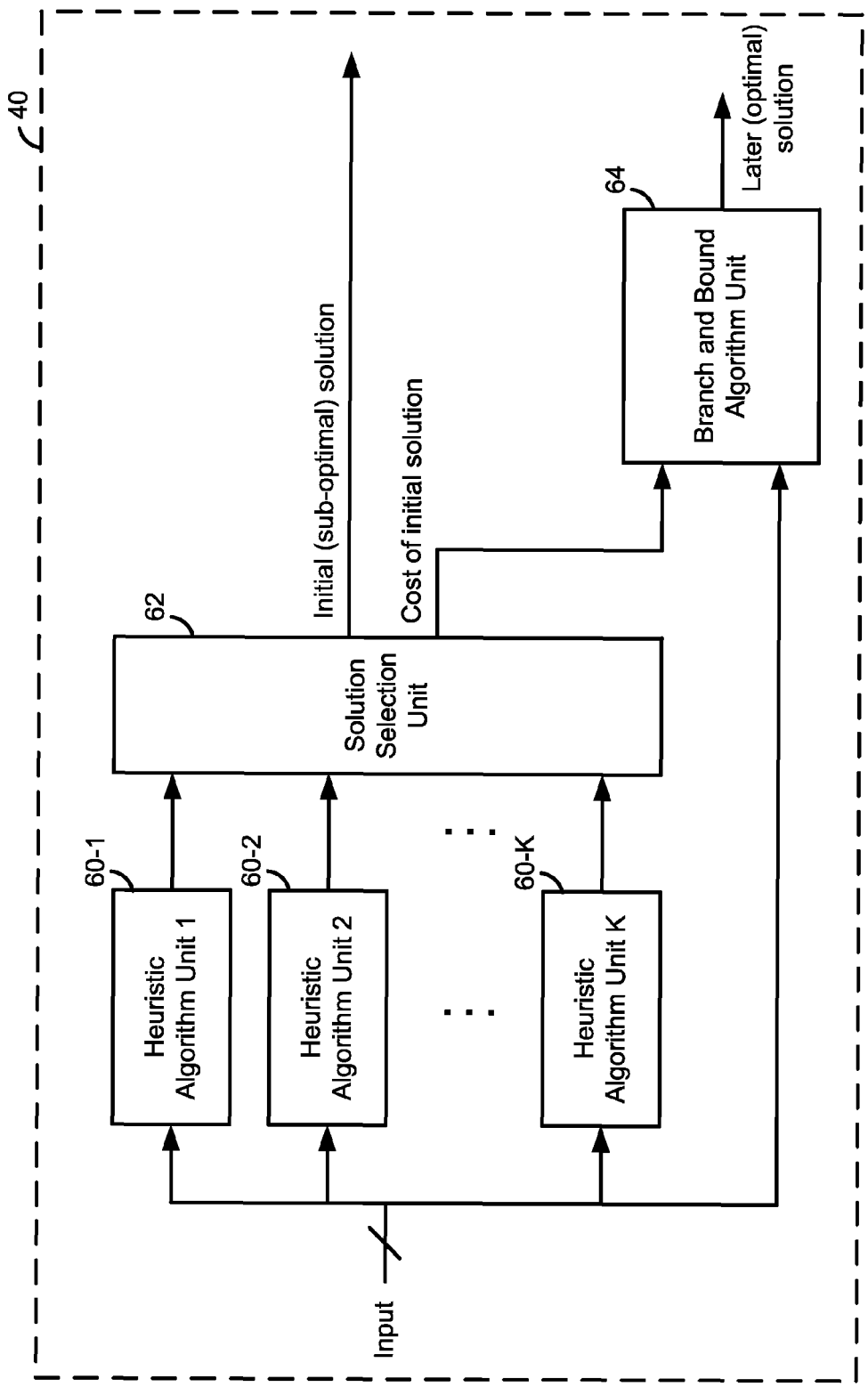
FIG. 4 is a block diagram showing the scheduling unit of the domain master device of FIG. 1 in more detail, according to an embodiment.

FIG. 4 is a block diagram of the scheduling unit 40 of the domain master device 14 of FIG. 1 in more detail, according to an embodiment. The scheduling unit 40 includes one or more heuristic algorithm units, shown as heuristic algorithm units 60-1, 60-2, . . . , and 60-K, a solution selection unit 62, and a branch and bound algorithm (BnB) unit 64. The scheduling unit 40 is configured to determine the allocation of time slots based on at least a plurality of resource requests, in an embodiment. The endpoint devices 20, 22, and 24 send a plurality of resource requests to the domain master device 14, in an embodiment. Each of the plurality of resource requests is indicative of a data rate (e.g., a target data rate requested by the EP) for a different one of the Links 1 through 6, in an embodiment. For example, the first endpoint device 20 may send a resource request that indicates a target data rate of 20 Mbps on the Link 1. In other embodiments, the resource request may include multiple requests, such as a first request for 20 Mbps on Link 1 and a second request for 120 Mbps on Link 2. The resource requests in some embodiments correspond to use of a Bandwidth Reservation protocol feature as described in §8.5.2 of ITU-T G.9961. Resource requests may optionally include a priority indicator, such as a requested quality of service level, in an embodiment. In some embodiments, the resource request also includes the estimated link capacities for the link during the time interval.

The scheduling unit 40 in one example determines an allocation based on a branch and bound algorithm for a given set of problem inputs (e.g., the plurality of resource requests and the plurality of estimated link capacities), according to an embodiment. The branch and bound algorithm provides a mathematically optimal solution (provided one exists), however, calculation of the optimal solution (i.e., an allocation of time slots) may take a relatively long period of time based on the number of links, the number of regions, processing power available for the algorithm, and other factors, according to an embodiment. In some embodiments, the scheduling unit 40 also determines one or more initial allocations using one or more heuristic algorithms that are of lower complexity. While the initial allocation is feasible, it is not necessarily optimal (in an embodiment) and is thus referred to herein as a sub-optimal allocation. A sub-optimal allocation is more likely to be calculated before the optimal allocation has been calculated, due to the reduced complexity of the heuristic algorithm, at least according to some embodiments. In some embodiments, the scheduling unit 40 determines a "cost" of the best (or only) sub-optimal allocation. The cost is then used to limit the size of a set of problems to be solved using the branch and bound algorithm. In some embodiments, the best (or the only allocation that has been calculated) sub-optimal allocation is implemented as an interim allocation until the optimal allocation has been determined by the branch and bound algorithm.

The heuristic algorithm units 60-1, 60-2, . . . , and 60-K calculate sub-optimal allocations according to respective heuristic algorithms. Examples of the heuristic algorithms include an absolute estimated link capacity maximization algorithm and a relative estimated link capacity maximization algorithm, as described herein. Other heuristic algorithms may be used in other embodiments. In some embodiments, the heuristic algorithm units 60-1, 60-2, . . . , and 60-K calculate respective sub-optimal allocations substantially in parallel. This allows the scheduling unit 40 to select a first available sub-optimal allocation as the interim allocation at least in some scenarios, according to an embodiment.

While the heuristic algorithm units 60-1, 60-2, . . . , and 60-K and the BnB unit 64 are shown as separate units, in some embodiments, the corresponding algorithms may be performed on a single processor (e.g., CPU 16). In other embodiments, a first processor performs one or more heuristic algorithms and a second processor (e.g., faster processing speed and more memory than the first processor) performs the branch and bound algorithm. In this case, the domain master device 14 may include multiple instances of the CPU 16, where each instance may be a same or different processor. Other suitable variations in distributed processing of algorithms and/or steps are utilized in other embodiments. The number and selection of heuristic algorithms performed by the scheduling unit 40 may be determined based on available processing resources.

The solution selection unit 62 is configured to select a sub-optimal allocation from those sub-optimal allocations provided by the heuristic algorithm units 60-1, 60-2, . . . , and 60-K. The solution selection unit 62 determines a cost associated with each sub-optimal allocation and selects the sub-optimal allocation with a lowest cost. Where only one sub-optimal allocation is available, the solution selection unit 62 selects the available sub-optimal allocation. The solution selection unit 62 in one embodiment determines the cost of a sub-optimal allocation as an amount of reserved time that will be used in the time interval if that sub-optimal allocation is used. Other suitable formulas and/or factors for determining the cost of the sub-optimal allocation are utilized in other embodiments. The solution selection unit 62 provides the cost of the selected (or only) sub-optimal allocation to the BnB unit 64.

The BnB unit 64 performs a branch and bound algorithm on a set of problems $\mathbb{P}$, which is determined based on the set of problem inputs, according to an embodiment. To improve efficiency, the BnB unit 64 uses the cost received from the solution selection unit 62 as an upper bound on costs of solutions determined by the branch and bound algorithm. The BnB unit 64 "prunes" branches at a faster rate using the upper bound and thus reduces the number of branches to be evaluated. The BnB unit 64 is configured to select a problem P from the set of problems $\mathbb{P}$ for which a cost function $f(x^*(P)) < f_U$ for an iteration of the branch and bound algorithm. In one example, the BnB unit 64 selects a first problem P in the set of problems $\mathbb{P}$, for example, where the set of problems $\mathbb{P}$ is an ordered list. In another example, the BnB unit 64 selects a problem P with a lowest cost function $f(x^*(P))$. In yet another example, the BnB unit 64 selects a problem P with a largest value for $\Sigma\delta_n$.

In an embodiment, the problem inputs include:

$N \in \mathbb{N}^+$;

$M \in \mathbb{N}^+$;

$h \in \mathbb{R}^+$;

$z = [z_1, z_2, \ldots z_i, \ldots z_N]^T$ with $z_i \in \mathbb{R}^+$;

$T = \sum_{j=1}^{M} t_j$ with $t_j \in \mathbb{R}^+$;

and $$c = \begin{bmatrix} c_{11} & c_{12} & \ldots & c_{1M} \\ c_{21} & c_{22} & \ldots & c_{2M} \\ \vdots & \vdots & \ddots & \vdots \\ c_{N1} & c_{N2} & \ldots & c_{NM} \end{bmatrix}$$

with $c_{ij} \in \mathbb{R}^+$ where:

$\mathbb{N}^+$ is the set of non-negative natural numbers;

$\mathbb{R}^+$ is the set of non-negative real numbers;

N is a number of unidirectional links (e.g., Links 1 through 6) for which there is a resource request (e.g., a bandwidth reservation request according to the Bandwidth Reservation protocol of §8.5.2 of ITU-T G.9961);

M is a number of regions or "time slots" used in Channel Estimation;

$t_j$ is a length of each region (e.g., a time duration), with an assumption that region boundaries are the same for all links;

h is a duration of transmission overhead (e.g., a time duration), such as preambles, headers, interframe gaps (IFGs), acknowledgments (ACKs), ACK interframe gaps (AIFGs), and/or other suitable overhead information;

$c_{ij}$ is an estimated line capacity (e.g., an estimated maximum data transmission speed) calculated by Channel Estimation for link i and region j;

$z_i$ is a target data rate (e.g., a requested data transmission speed) for link i as determined by the Bandwidth Reservation protocol of §8.5.2 of ITU-T G.9961, for example;

$e_i$ is an allocated data rate for link i;

$x_{ij}$ is a Fraction of Region/Allocated to Link i (e.g., a Segment of a Time Slot); and $f$ is a total amount of time allocated to all links in all regions.

The scheduling unit 40 in one example minimizes the total amount of time $f$ in order to leave as much channel capacity available as possible, according to an embodiment.

In an embodiment, the scheduling unit 40 is configured to find the value of x:

$$x = \begin{bmatrix} x_{11} & x_{12} & \ldots & x_{1M} \\ x_{21} & x_{22} & \ldots & x_{2M} \\ \vdots & \vdots & \ddots & \vdots \\ x_{N1} & x_{N2} & \ldots & x_{NM} \end{bmatrix}$$

which minimizes $$f = \sum_{i=1}^{N} \sum_{j=1}^{M} x_{ij} \cdot t_j$$

subject to the following constraints $\forall i \in \{1 \ldots N\}$ and $\forall j \in \{1 \ldots M\}$:

$x_{ij} \geq 0$ (Equation 1)

$x_{ij} \cdot t_j - h \cdot \delta_{ij} \geq 0$ (Equation 2)

$\sum_{i=1}^{N} x_{ij} \leq 1$ (Equation 3)

$e_i = \frac{1}{T} \sum_{j=1}^{M} [x_{ij} \cdot t_j - h \cdot \delta_{ij}] \cdot c_{ij} \geq z_i$ (Equation 4)

where $\delta_{ij}$ is defined as:

$$\delta_{ij} = \begin{cases} 1 & \text{if } x_{ij} > 0 \\ 0 & \text{if } x_{ij} = 0 \end{cases}.$$

Equation 1 is called a Positivity constraint. Equation 2 is called a Minimum allocation constraint. Equation 3 is called a Maximum allocation constraint. Equation 4 is called a Target data rate constraint. The constraints corresponding to Equations 1-4 can be converted to a matrix form, an example of which for N=2 and M=3 is now provided.

The matrix x is rewritten to:

$$x = \begin{bmatrix} x_{11} & x_{12} & x_{13} \\ x_{21} & x_{22} & x_{23} \end{bmatrix} = \begin{bmatrix} y_1 & y_2 & y_3 \\ y_4 & y_5 & y_6 \end{bmatrix}$$

and the matrix $\delta$ is rewritten to $$\delta = \begin{bmatrix} \delta_{11} & \delta_{12} & \delta_{13} \\ \delta_{21} & \delta_{22} & \delta_{23} \end{bmatrix} = \begin{bmatrix} \Delta_1 & \Delta_2 & \Delta_3 \\ \Delta_4 & \Delta_5 & \Delta_6 \end{bmatrix}.$$

Using the following constants for simplified notation $$k_{ij} = \frac{c_{ij} t_j}{T}$$

and $$p_{ij} = \frac{c_{ij} h}{T}$$

the constraints can be rewritten in terms of $y_n$. The original set of constraints (3) and (4) was:

$(k_{11}x_{11}-p_{11}\delta_{11})+(k_{12}x_{12}-p_{12}\delta_{12})+(k_{13}x_{13}-p_{13}\delta_{13}) \geq z_1$ $(k_{21}x_{21}-p_{21}\delta_{21})+(k_{22}x_{22}-p_{22}\delta_{22})+(k_{23}x_{23}-p_{23}\delta_{23}) \geq z_2$ $x_{11}+x_{21} \leq 1$ $x_{12}+x_{22} \leq 1$ $x_{13}+x_{23} \leq 1$ which, with the notation change, is now $e_1 = (k_{11}y_1-p_{11}\Delta_1)+(k_{12}y_2-p_{12}\Delta_2)+(k_{13}y_3-p_{13}\Delta_3) \geq z_1$ $e_2 = (k_{21}y_4-p_{21}\Delta_4)+(k_{22}y_5-p_{22}\Delta_5)+(k_{23}y_6-p_{23}\Delta_6) \geq z_2$ $y_1+y_4 \leq 1$ $y_2+y_5 \leq 1$ $y_3+y_6 \leq 1.$ The constraints can then be converted to matrix form:

$$\begin{bmatrix} k_{11} & k_{12} & k_{13} & 0 & 0 & 0 \\ 0 & 0 & 0 & k_{21} & k_{22} & k_{23} \\ -1 & 0 & 0 & -1 & 0 & 0 \\ 0 & -1 & 0 & 0 & -1 & 0 \\ 0 & 0 & -1 & 0 & 0 & -1 \end{bmatrix} \cdot \begin{bmatrix} y_1 \\ y_2 \\ y_3 \\ y_4 \\ y_5 \\ y_6 \end{bmatrix} \geq \begin{bmatrix} z_1 \\ z_2 \\ -1 \\ -1 \\ -1 \end{bmatrix} +$$

$$\begin{bmatrix} p_{11} & p_{12} & p_{13} & 0 & 0 & 0 \\ 0 & 0 & 0 & p_{21} & p_{22} & p_{23} \\ 0 & 0 & 0 & 0 & 0 & 0 \\ 0 & 0 & 0 & 0 & 0 & 0 \\ 0 & 0 & 0 & 0 & 0 & 0 \end{bmatrix} \cdot \begin{bmatrix} \Delta_1 \\ \Delta_2 \\ \Delta_3 \\ \Delta_4 \\ \Delta_5 \\ \Delta_6 \end{bmatrix}$$

For the Equations 1 and 2, if $y_n > 0$ then $\Delta_n = 1$. In this case, the constraint from Equation 2 is more restrictive than the constraint in Equation 1, which can thus be ignored. However, if $y_n = 0$ then $\Delta_n = 0$, and Equation 2 becomes irrelevant. These two options can be introduced in the matrix form above as follows $$\begin{bmatrix} k_{11} & k_{12} & k_{13} & 0 & 0 & 0 \\ 0 & 0 & 0 & k_{21} & k_{22} & k_{23} \\ -1 & 0 & 0 & -1 & 0 & 0 \\ 0 & -1 & 0 & 0 & -1 & 0 \\ 0 & 0 & -1 & 0 & 0 & -1 \\ r_1 & 0 & 0 & 0 & 0 & 0 \\ 0 & r_2 & 0 & 0 & 0 & 0 \\ 0 & 0 & r_3 & 0 & 0 & 0 \\ 0 & 0 & 0 & r_4 & 0 & 0 \\ 0 & 0 & 0 & 0 & r_5 & 0 \\ 0 & 0 & 0 & 0 & 0 & r_6 \end{bmatrix} \cdot \begin{bmatrix} y_1 \\ y_2 \\ y_3 \\ y_4 \\ y_5 \\ y_6 \end{bmatrix} \geq \begin{bmatrix} z_1 \\ z_2 \\ -1 \\ -1 \\ -1 \\ 0 \\ 0 \\ 0 \\ 0 \\ 0 \\ 0 \end{bmatrix} +$$

$$\begin{bmatrix} p_{11} & p_{12} & p_{13} & 0 & 0 & 0 \\ 0 & 0 & 0 & p_{21} & p_{22} & p_{23} \\ 0 & 0 & 0 & 0 & 0 & 0 \\ 0 & 0 & 0 & 0 & 0 & 0 \\ 0 & 0 & 0 & 0 & 0 & 0 \\ p_{11} & 0 & 0 & 0 & 0 & 0 \\ 0 & p_{12} & 0 & 0 & 0 & 0 \\ 0 & 0 & p_{13} & 0 & 0 & 0 \\ 0 & 0 & 0 & p_{14} & 0 & 0 \\ 0 & 0 & 0 & 0 & p_{15} & 0 \\ 0 & 0 & 0 & 0 & 0 & p_{16} \end{bmatrix} \cdot \begin{bmatrix} \Delta_1 \\ \Delta_2 \\ \Delta_3 \\ \Delta_4 \\ \Delta_5 \\ \Delta_6 \end{bmatrix}$$

While the above inputs and constraints have been shown in a matrix form, they cannot be directly solved using linear programming techniques (e.g., Simplex method or Interior Point method), at least in some embodiments and/or scenarios. This is due to the reliance on the actual values of $x_{ij}$, which restricts the possible range of values for $x_{ij}$ to the non-convex set given by:

$$x_{ij} \in \left\{ 0, \left[\frac{h}{t_j} \ldots 1\right] \right\}.$$

However, the non-convex solution region can be partitioned into a number of convex sub-regions, allowing for local optima to be found in each convex sub-region, which can then be combined to find a global optimum for the non-convex solution region. In an embodiment, the scheduling unit 40 creates convex sub-regions by restricting possible values of $x_{ij}$ into two options: either $x_{ij} = 0$ (in which case $\delta_{ij} = 0$)

or $x_{ij} \in \left[\frac{h}{t_j}, 1\right]$ (in which case $\delta_{ij} = 1$).

In a general problem with N links and M regions, there are N·M variables, and thus the number of sub-problems grows exponentially as $2^{N \cdot M}$.

The scheduling unit 40 reduces the number of sub-problems using the BnB unit 64. The BnB unit 64 uses an upper bound $f_U$ as a value of the cost function for a complete problem $P_0$ (e.g., the original non-convex solution region). The problem $P_0$ can be divided into a plurality of (e.g., two) sub-problems $P_a$ with $\delta_{ij}=0$ and $P_b$ with $\delta_{ij}=1$ (for a certain "i" and "j"). For a solution for $P_a$, referred to as $x_a$, the cost function is $f(x_a)$. For a solution for $P_b$ referred to as $x_b$, the cost function is $f(x_b)$. If $f(x_a) > f_U$, then the solution for $P_a$ cannot be the solution for $P_0$, because its corresponding cost function is higher than the initial upper bound $f_U$. In this case, all sub-problems in which $\delta_{ij}=0$ can be ignored thus reducing the number of problems to be solved. If $f(x_b) > f_U$, then the solution for $P_b$ is not the solution for $P_0$, because its cost function is higher than the initial upper bound $f_U$. In this case, all sub-problems in which $\delta_{ij}=1$ can be ignored.

The BnB unit 64 in one example uses the cost of the selected (or only) sub-optimal allocation received from the solution selection unit 64 as the initial value for the upper bound $f_U$. During calculation of the problems, the BnB unit 64 may update the upper bound $f_U$ as lower values are found. An example of the branch and bound algorithm is presented for explanatory purposes, where:

$\mathbb{P}$ is a set of problems under consideration;

P is a generic problem, which is characterized by vectors $\{\theta_n\}$ and $\{\Delta_n\}$;

$\theta_n$ is an auxiliary variable that tracks whether restriction (2) has been relaxed for $y_n$, where $\theta_n=0$ means that the restriction is still relaxed ($\Delta_n$ assumed 0) and $\theta_n=1$ means that the restriction is not relaxed ($\Delta_n$ is set to either 0 or 1);

$P_0$ is an original non-convex problem, with all constraints as defined in Equations (1), (2), (3), and (4);

$P_1$ is a relaxed version of problem $P_0$, in which Equation (2) is ignored for all $y_n$, and $\Delta_n=0$, $\forall n$;

$x_0$ is a solution for the original non-convex Problem $P_0$;

$f(x_0)$ is a cost function for the solution of the original non-convex Problem $P_0$;

$x^*(P)$ is a solution for relaxed problem P;

$f(x^*(P))$ is a cost function for the solution of relaxed Problem P;

$f_U$ is an upper bound on $f(x_0)$; and $x_U$ is a temporary solution for problem $P_0$.

The branch and bound algorithm in this example proceeds as follows, according to an embodiment:

1. Initialize list $\mathbb{P}=\{\emptyset\}$.
2. Start with $P_0$ and relax constraints to build $P_1$, which has $\theta_n=0$ and $\delta_n=0$, for $n\in[1, N\cdot M]$.
3. Solve $P_1$. If $P_1$ is unfeasible, then $P_0$ is also unfeasible and the algorithm stops.
4. Compute initial value for $f_U$ (for example, using one of the heuristic algorithms herein). If an initial value is not available, use T+1 as the initial value. Note that $f(x^*(P_1))$ is not a valid starting point for $f_U$, as $x^*(P_1)$ is not a feasible solution of $P_0$.
5. Add $P_1$ to list $\mathbb{P}$.
6. Extract from list $\mathbb{P}$ a problem P for which $f(x^*(P))<f_U$. If no such problem exist, return $x_0=x_U$.
7. Choose a variable $y_k$ which is still relaxed, that is, for which $\theta_k=0$.
8. Build $P_a$, which is the same as P, but with $\theta_k=1$ and $\Delta_k=0$.
9. Build $P_b$, which is the same as P, but with $\theta_k=1$ and $\Delta_k=1$.
10. Solve $P_a$ and $P_b$, obtaining solutions $x^*(P_a)$ and $x^*(P_b)$.
11. IF $P_a$ is feasible AND $x^*(P_a)$ is a feasible solution of $P_0$ AND $f(x^*(P_a))<f_U$, THEN make $f_U=f(x^*(P_a))$ and make $x_U=x^*(P_a)$.
12. IF $P_b$ is feasible AND $x^*(P_b)$ is a feasible solution of $P_0$ AND $f(x^*(P_b))<f_U$, THEN make $f_U=f(x^*(P_b))$ and make $x_U=x^*(P_b)$.
13. IF $P_a$ is feasible AND $f(x^*(P_a))<f_U$, THEN add $P_a$ to $\mathbb{P}$.
14. IF $P_b$ is feasible AND $f(x^*(P_b))<f_U$, THEN add $P_b$ to $\mathbb{P}$.
15. Go back to step 6.

As described above, the scheduling unit 40 in one example uses an absolute estimated link capacity maximization algorithm as one of the heuristic algorithms, according to an embodiment. An example absolute estimated link capacity maximization algorithm, according to an embodiment, comprises: choose i and j for which $c_{ij}$ is maximum; allocate a time slot (as large as required and allowed) to link i in region j; when $e_i$ in a link achieves its target value $z_i$, remove link i from the list of links to process; when a region j has been fully allocated (that is, when $\Sigma_{i=1}^N x_{ij}=1$) remove region j from list of regions to process; repeat the above process until all links have $e_i \geq z_i$ (e.g., target data rate achieved) or until all regions have $\Sigma_{i=1}^N x_{ij}=1$ (target data rate not achieved).

The example absolute estimated link capacity maximization algorithm, according to an embodiment, further includes:

1. Initialize the following variables:

$x_{ij} := 0$ (algorithm output and intermediate allocation steps)

$e_i := 0 \left(\text{a capacity allocated to link i, equal to } \frac{1}{T}\sum_j x_{ij} c_{ij} t_j\right)$ $\epsilon_j := 0 \left(\text{a fraction of capacity allocated in region j, equal to } \sum_i x_{ij}\right)$ $\mathbb{L} := \{1, 2, \ldots, N\}$ (a set of links for which $e_i < z_i$)
   $\mathbb{K} := \{1, 2, \ldots, M\}$ (a set of regions for which $\epsilon_j < 1$)

2. If $\mathbb{L} = \{\emptyset\}$ then exit the algorithm and return OK. (The algorithm has found a feasible solution).
3. If $\mathbb{K} = \{\emptyset\}$ then exit the algorithm and return ERROR. (The algorithm cannot find a feasible solution.)
4. Choose $a \in \mathbb{L}$ and $b \in \mathbb{K}$ such that $c_{ab} > c_{ij}, \forall i \in \mathbb{L}, \forall j \in \mathbb{K}$.
5. Calculate temporal variable $\tau$ $$\tau := \frac{T(z_a - e_a)}{c_{ab}} + h$$

6. IF $\tau < t_b(1 - \epsilon_b)$ THEN $$x_{ab} := \frac{\tau}{t_b}$$

$$e_a := e_a + \frac{(\tau - h)c_{ab}}{T} = z_a$$

$$\epsilon_b := \epsilon_b + x_{ab}$$
$$\mathbb{L} := \mathbb{L} - \{a\}$$

ELSE $$x_{ab} := 1 - \epsilon_b$$

$$e_a := e_a + \frac{(x_{ab} t_b - h)c_{ab}}{T} \text{ (if } x_{ab} t_b > h\text{)}$$

$$\epsilon_b := \epsilon_b + x_{ab} = 1$$
$$\mathbb{K} := \mathbb{K} - \{b\}$$

7. Go back to Step 2.

Although the example absolute estimated link capacity maximization algorithm is not guaranteed to find an optimal solution, it can generally be completed in at most N+M steps, thus more quickly than the branch and bound algorithm, according to an embodiment. Advantageously, the example absolute estimated link capacity maximization algorithm accounts for the overhead (h) associated with data communicated on the plurality of communication links, according to an embodiment.

As described above, the example scheduling unit 40, in one embodiment, uses a relative estimated link capacity maximization algorithm as one of the heuristic algorithms. In one embodiment, the relative estimated link capacity maximization algorithm differs from the absolute estimated link capacity maximization algorithm in that instead of choosing the (i,j) for which $c_{ij}$ is largest, the scheduling unit 40 searches for values (i,j) which maximize $$r_{ij} = \frac{c_{ij}}{\frac{1}{T}\sum_k c_{ik} \cdot t_k}$$

which represents the ratio between the capacity for link i in region j and the average capacity for link i across all regions. The maximum of $r_{ij}$ corresponds to a (link, region) pair with higher capacity than the rest of the regions for the same link, allowing for allocation of channel time to pairs with higher capacity first.

The example relative estimated link capacity maximization algorithm, in one embodiment, comprises:

---

1. Initialize the following variables:
   $x_{ij} := 0$ (algorithm output and intermediate allocation steps)

$e_i := 0 \left( \text{a capacity allocated to link i, equal to } \frac{1}{T} \sum_j x_{ij} c_{ij} t_j \right)$ $\epsilon_j := 0 \left( \text{a fraction of capacity allocated in region j, equal to } \sum_i x_{ij} \right)$ $\mathbb{L} := \{1, 2, \ldots, N\}$ (a set of links for which $e_i < z_i$)
   $\mathbb{K} := \{1, 2, \ldots, M\}$ (a set of regions for which $\epsilon_j < 1$)
2. If $\mathbb{L} = \{\emptyset\}$ then exit the algorithm and return OK. (The algorithm has found a feasible solution).
3. If $\mathbb{K} = \{\emptyset\}$ then exit the algorithm and return ERROR. (The algorithm cannot find a feasible solution.)
4. Calculate $$r_{ij} := \frac{c_{ij}}{\frac{1}{T} \sum_k c_{ik} \cdot t_k} \quad \forall i \in \mathbb{L}, \forall j \in \mathbb{K}$$

5. Choose $a \in \mathbb{L}$ and $b \in \mathbb{K}$ such that $r_{ab} \geq r_{ij}, \forall i \in \mathbb{L}, \forall j \in \mathbb{K}$.
5. Calculate temporal variable $\tau$ $$\tau := \frac{T(z_a - e_a)}{c_{ab}} + h$$

6. IF $\tau < t_b(1 - \epsilon_b)$ THEN $$x_{ab} := \frac{\tau}{t_b}$$

$$e_a := e_a + \frac{(\tau - h)c_{ab}}{T} = z_a$$

$\epsilon_b := \epsilon_b + x_{ab}$
   $\mathbb{L} := \mathbb{L} - \{a\}$

ELSE $x_{ab} := 1 - \epsilon_b$ $$e_a := e_a + \frac{(x_{ab}t_b - h)c_{ab}}{T} \quad (\text{if } x_{ab}t_b > h)$$

$\epsilon_b := \epsilon_b + x_{ab} = 1$
   $\mathbb{K} := \mathbb{K} - \{b\}$
7. Go back to Step 2.

---

Although the example relative estimated link capacity maximization algorithm is not guaranteed to find an optimal solution, it can also generally be completed in at most N+M steps, thus more quickly than the branch and bound algorithm, according to an embodiment. Advantageously, the relative estimated link capacity maximization algorithm accounts for the overhead (h) associated with data communicated on the plurality of communication links, according to an embodiment.

Figure 5:
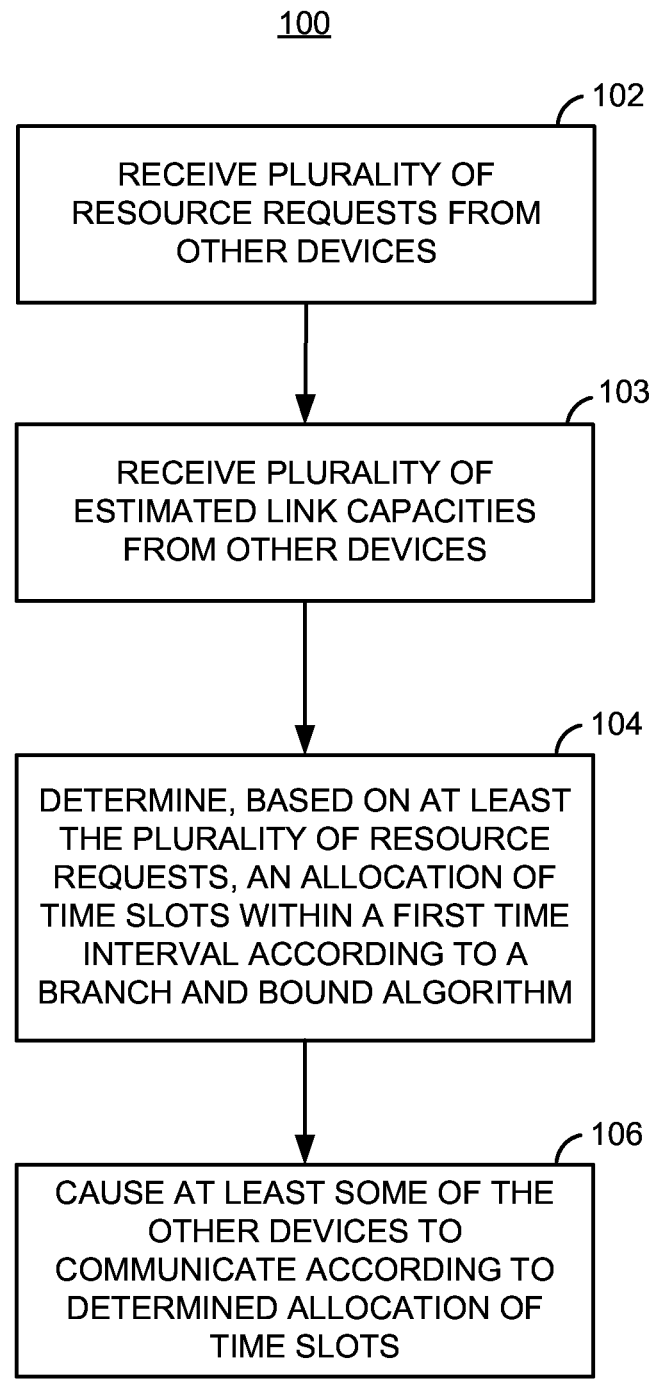
FIG. 5 is a flow diagram illustrating an example method, implemented in a first device of a plurality of devices coupled to a network, of allocating network resources, according to an embodiment.

FIG. 5 is a flow diagram of an example method 100, implemented in a first device of a plurality of devices coupled to a network, of allocating network resources, according to an embodiment. In one illustrative example, the domain master device 14 is the first device and the plurality of devices includes the endpoint devices 20, 22, and 24, and the method 100 is discussed in the context of this example for explanatory purposes. In other embodiments, however, the method 100 is implemented in other suitable contexts.

The domain master device 14 receives (102) a plurality of resource requests from one or more other devices (e.g., the endpoint devices 20, 22, and 24). The domain master device 14 receives (103) a plurality of estimated link capacities from the one or more other devices (e.g., the endpoint devices 20, 22, and 24). The domain master device 14 determines (104), based on at least the plurality of resource requests, and the plurality of estimated link capacities, an allocation of time slots within a first time interval (e.g., 40 milliseconds or two cycles of 20 milliseconds) according to a branch and bound algorithm. The allocation of time slots reserves different segments of the first time interval for use by different communication links of the plurality of communication links (e.g., Links 1 through 6). As one illustrative example, where the first endpoint device 20 requests a target data rate of 100 Mbps on Link 1 and the second endpoint device 22 requests a target data rate of 120 Mbps on Link 3, the domain master device 14 may allocate time slots for a segment from 0 to 12 milliseconds and a segment from 12 to 20 milliseconds to Link 1 and time slots for a segment from 20 to 28 milliseconds and from 28 to 36 milliseconds to Link 3. This allocation provides 20 out of 40 milliseconds per instance of the first time interval at 200 Mbps for Link 1 (thus reaching the target 100 Mbps over the entire first time interval) and 16 out of 40 milliseconds at 300 Mbps for Link 3 (thus reaching the target 120 Mbps over the entire first time interval).

The domain master device 14 causes (106) at least some of the other devices of the plurality of devices to communicate via the plurality of communication links according to the determined allocation of time slots. For example, the domain master device 14 sends one or more scheduling messages (e.g., MAP messages) to one or more of the endpoint devices 20, 22, and 24. The domain master device 14 may further determine a first sub-optimal allocation of time slots according to a first heuristic algorithm. For example, the problem inputs P are provided to one or more heuristic algorithm units 60-1, 60-2, . . . , and 60-K which provide the first sub-optimal allocation. The domain master device 14 may also determine a second sub-optimal allocation of time slots according to a second heuristic algorithm, or additional sub-optimal allocations based on available resources or heuristic algorithm units.

The domain master device 14 determines a cost associated with the available sub-optimal allocations. The domain master device 14 in one example uses a cost function $$f = \sum_{i=1}^{N} \sum_{j=1}^{M} x_{ij} \cdot t_j$$

to determine the costs. In this case, the cost is an amount of reserved time that will be used in the first time interval if the sub-optimal allocation of time slots is used. The domain master device 14 then selects the sub-optimal allocation with the lowest cost (e.g., the first sub-optimal allocation or the second sub-optimal allocation). The domain master device 14 determines whether the selected sub-optimal allocation is feasible, and if so, uses the selected sub-optimal allocation as an interim allocation for the network 10 (e.g., at least until the allocation of time slots according to the branch and bound algorithm has been determined). The domain master device 14 also provides the lowest cost to the BnB unit 64 for use as the upper bound, as described above. If the BnB unit 64 determines the optimal allocation before the set of problems ℙ "expires," then the scheduling unit 40 uses the optimal allocation for the network 10. The set of problems ℙ expires when there is a change to one or more of the input values, such as the estimated link capacities or target data rates.

Figure 6:
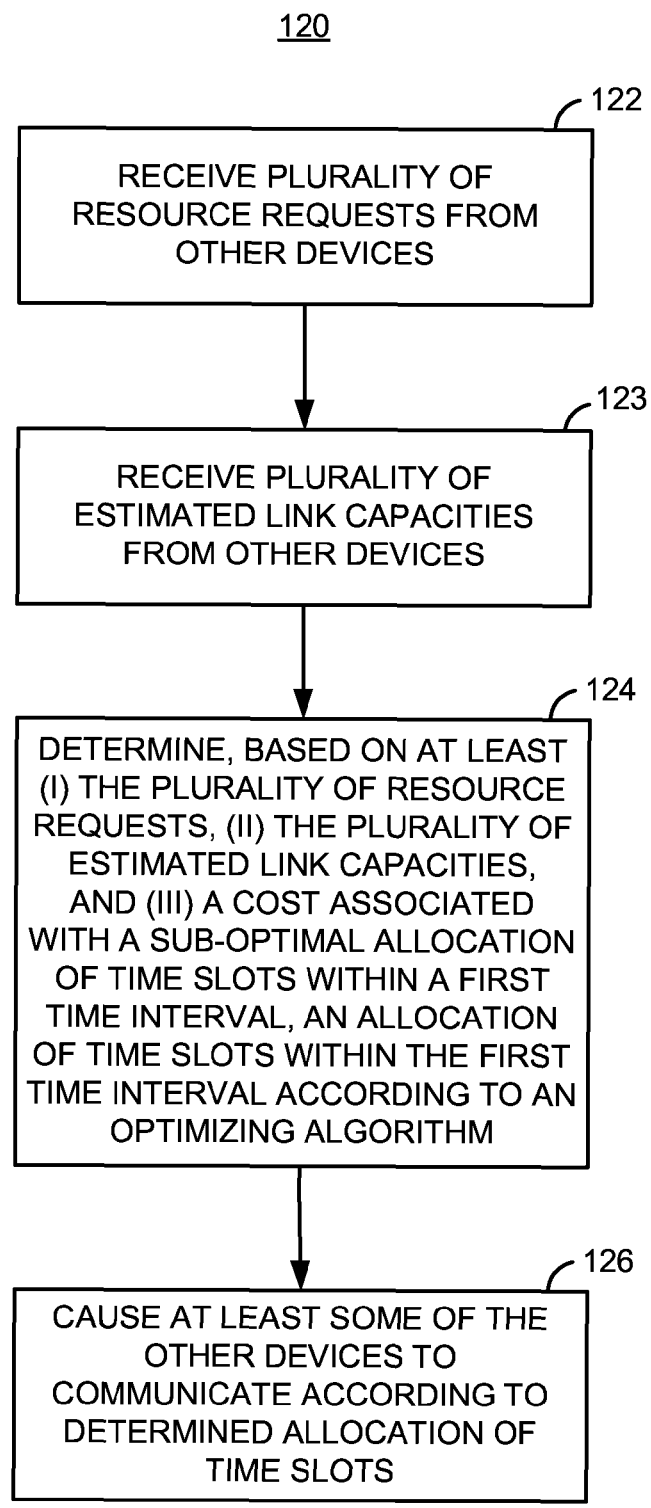
FIG. 6 is a flow diagram illustrating another example method, implemented in a first device of a plurality of devices coupled to a network, of allocating network resources, according to an embodiment.

FIG. 6 is a flow diagram of another example method 120, implemented in a first device of a plurality of devices coupled to a network, of allocating network resources, according to an embodiment. In one example, the domain master device 14 is the first device and the plurality of devices includes the endpoint devices 20, 22, and 24, and the method 120 is discussed in the context of this example for explanatory purposes. In other embodiments, however, the method 120 is implemented in other suitable contexts.

The domain master device 14 receives (122) a plurality of resource requests from the other devices of the network 10 (e.g., endpoint devices 20, 22, and 24). The resource requests indicate a requested data rate for a different one of a plurality of communication links, such as a target data rate. The resource requests may further indicate an estimated link capacity for the corresponding communication link. The domain master device 14 receives (123) a plurality of estimated link capacities from the one or more other devices (e.g., the endpoint devices 20, 22, and 24).

The domain master device 14 determines, based on at least (i) the plurality of resource requests, (ii) the plurality of estimated link capacities, and (iii) a cost associated with a sub-optimal allocation of time slots within a first time interval, an allocation of time slots within the first time interval according to an optimizing algorithm. In one example, the optimizing algorithm is the branch and bound algorithm described above. The allocation of time slots reserves different segments of the first time interval for use by different communication links of the plurality of communication links. The domain master device 14 determines the sub-optimal allocation using one or more of the heuristic algorithms and determines the corresponding cost using a cost function, as described above. Where multiple sub-optimal allocations are available, the domain master device 14 selects the sub-optimal allocation with the lowest cost. The domain master device 14 causes at least some of the other devices of the plurality of devices to communicate via the plurality of communication links according to the determined allocation of time slots. For example, the domain master device 14 sends one or more scheduling messages (e.g., MAP messages) to one or more of the endpoint devices 20, 22, and 24. The domain master device 14 may send multiple MAP messages, for example, a first MAP message based on the sub-optimal allocation and, when available, a second MAP message based on the allocation from the optimizing algorithm.

Further aspects of the present invention relate to one or more of the following clauses.

In an embodiment, a method of allocating resources is implemented in a first device of a plurality of devices coupled to a network. The method includes receiving, at the first device and from other devices of the plurality of devices, a plurality of resource requests, wherein each of the plurality of resource requests is indicative of a requested data rate for a different one of a plurality of communication links, and wherein each of the plurality of communication links is associated with a respective pair of devices within the plurality of devices; receiving, at the first device and from the other devices of the plurality of devices, a plurality of estimated link capacities, wherein each of the plurality of estimated link capacities is indicative of an available data rate for the different ones of the plurality of communication links; determining, at the first device and based on at least the plurality of resource requests and the plurality of estimated link capacities, an allocation of time slots within a first time interval according to a branch and bound algorithm, wherein the allocation of time slots reserves different segments of the first time interval for use by different communication links of the plurality of communication links; and causing at least some of the other devices of the plurality of devices to communicate via the plurality of communication links according to the determined allocation of time slots.

In other embodiments, the method includes any suitable combination of one or more of the following features.

The method further includes determining, at the first device and based on at least the plurality of resource requests and the plurality of estimated link capacities, a first sub-optimal allocation of time slots within the first time interval according to a first heuristic algorithm, wherein the first sub-optimal allocation of time slots reserves different segments of the first time interval for use by different communication links of the plurality of communication links; and determining, at the first device, a cost associated with the first sub-optimal allocation of time slots, wherein determining the allocation of time slots according to the branch and bound algorithm includes determining the allocation of times slots based on at least (i) the plurality of resource requests, (ii) the plurality of estimated link capacities, and (iii) the cost associated with the first sub-optimal allocation of time slots.

Determining a cost associated with the first sub-optimal allocation of time slots includes determining an amount of reserved time that will be used in the first time interval if the first sub-optimal allocation of time slots is used.

Determining the allocation of times slots according to the branch and bound algorithm includes using the cost associated with the first sub-optimal allocation of time slots as an upper bound on costs of solutions provided by the branch and bound algorithm.

The method further includes: determining, at the first device and based on at least the plurality of resource requests and the plurality of estimated link capacities, a second sub-optimal allocation of time slots within the first time interval according to a second heuristic algorithm different from the first heuristic algorithm, wherein the second sub-optimal allocation of time slots reserves different segments of the first time interval for use by different communication links of the plurality of communication links; determining, at the first device, a cost associated with the second sub-optimal allocation of time slots; and determining, at the first device, a lowest cost among a plurality of costs, wherein the plurality of costs includes at least (i) the cost associated with the first sub-optimal allocation of time slots and (ii) the cost associated with the second sub-optimal allocation of time slots, wherein determining the allocation of time slots according to the branch and bound algorithm includes determining the allocation of times slots based on at least (i) the plurality of resource requests, (ii) the plurality of estimated link capacities, and (iii) the determined lowest cost.

The method further includes causing at least some of the other devices of the plurality of devices to communicate according to the determined first sub-optimal allocation of time slots at least until the allocation of time slots according to the branch and bound algorithm has been determined.

Causing at least some of the other devices to communicate according to the determined allocation of time slots includes sending one or more scheduling messages to at least some of the other devices of the plurality of devices.

Determining the allocation of time slots within the first time interval according to the branch and bound algorithm includes optimally determining the allocation of time slots within the first time interval while accounting for overhead associated with data communicated on the plurality of communication links.

The method further includes determining the time slots within the first time interval based on at least the plurality of estimated link capacities.

In another embodiment, a device comprises a network interface configured to receive, from other devices of a plurality of devices coupled to a network, a plurality of resource requests and a plurality of estimated link capacities, wherein each of the plurality of resource requests is indicative of a requested data rate for a different one of a plurality of communication links, and wherein each of the plurality of communication links is associated with a respective pair of devices within the plurality of devices, and wherein each of the plurality of estimated link capacities is indicative of an available data rate for the different ones of the plurality of communication links; and a scheduling unit configured to determine, based on at least the plurality of resource requests and the plurality of estimated link capacities, an allocation of time slots within a first time interval according to a branch and bound algorithm, wherein the allocation of time slots reserves different segments of the first time interval for use by different communication links of the plurality of communication links, and cause at least some of the other devices of the plurality of devices to communicate via the plurality of communication links according to the determined allocation of time slots.

In other embodiments, the device includes any suitable combination of one or more of the following features.

The scheduling unit is further configured to determine, based on at least the plurality of resource requests and the plurality of estimated link capacities, a first sub-optimal allocation of time slots within the first time interval according to a first heuristic algorithm, wherein the first sub-optimal allocation of time slots reserves different segments of the first time interval for use by different communication links of the plurality of communication links, and determine a cost associated with the first sub-optimal allocation of time slots. The scheduling unit is configured to determine the allocation of time slots according to the branch and bound algorithm based on at least (i) the plurality of resource requests, (ii) the plurality of estimated link capacities, and (iii) the cost associated with the first sub-optimal allocation of time slots.

The scheduling unit is configured to determine the allocation of times slots at least by using the cost associated with the first sub-optimal allocation of time slots as an upper bound on costs of solutions provided by the branch and bound algorithm.

The scheduling unit is further configured to determine, based on at least the plurality of resource requests and the plurality of estimated link capacities, a second sub-optimal allocation of time slots within the first time interval according to a second heuristic algorithm different from the first heuristic algorithm, wherein the second sub-optimal allocation of time slots reserves different segments of the first time interval for use by different communication links of the plurality of communication links, determine a cost associated with the second sub-optimal allocation of time slots, and determine a lowest cost among a plurality of costs, wherein the plurality of costs includes at least (i) the cost associated with the first sub-optimal allocation of time slots and (ii) the cost associated with the second sub-optimal allocation of time slots. The scheduling unit is configured to determine the allocation of time slots according to the branch and bound algorithm based on at least (i) the plurality of resource requests, (ii) the plurality of estimated link capacities, and (iii) the determined lowest cost.

The scheduling unit is configured to cause at least some of the other devices to communicate according to the determined allocation of time slots at least by causing the network interface to send one or more scheduling messages to at least some of the other devices of the plurality of devices.

In yet another embodiment, a method of allocating resources is implemented in a first device of a plurality of devices coupled to a network. The method includes: receiving, at the first device and from other devices of the plurality of devices, a plurality of resource requests, wherein each of the plurality of resource requests is indicative of a requested data rate for a different one of a plurality of communication links, and wherein each of the plurality of communication links is associated with a respective pair of devices within the plurality of devices; receiving, at the first device and from the other devices of the plurality of devices, a plurality of estimated link capacities, wherein each of the plurality of estimated link capacities is indicative of an available data rate for the different ones of the plurality of communication links; determining, at the first device and based on at least (i) the plurality of resource requests, (ii) the plurality of estimated link capacities, and (iii) a cost associated with a sub-optimal allocation of time slots within a first time interval, an allocation of time slots within the first time interval according to an optimizing algorithm while accounting for overhead associated with data communicated on the plurality of communication links, wherein the allocation of time slots reserves different segments of the first time interval for use by different communication links of the plurality of communication links; and causing at least some of the other devices of the plurality of devices to communicate via the plurality of communication links according to the determined allocation of time slots.

In other embodiments, the method includes any suitable combination of one or more of the following features.

Determining the allocation of time slots according to an optimizing algorithm includes determining the allocation of time slots according to a branch and bound algorithm.

Determining the allocation of time slots according to the branch and bound algorithm includes using the cost associated with the sub-optimal allocation of time slots as an upper bound on costs of solutions provided by the branch and bound algorithm.

The method further includes determining, at the first device, the sub-optimal allocation of time slots according to a heuristic algorithm, wherein the sub-optimal allocation of time slots reserves different segments of the first time interval for use by different communication links of the plurality of communication links; and causing at least some of the other devices of the plurality of devices to communicate according to the determined sub-optimal allocation of time slots until after the allocation of time slots within the first time interval is determined according to the optimizing algorithm.

The method further includes: determining, at the first device, a first sub-optimal allocation of time slots according to a first heuristic algorithm, wherein the first sub-optimal allocation of time slots reserves different segments of the first time interval for use by different communication links of the plurality of communication links; determining, at the first device, a second sub-optimal allocation of time slots according to a second heuristic algorithm different from the first heuristic algorithm, wherein the second sub-optimal allocation of time slots reserves different segments of the first time interval for use by different communication links of the plurality of communication links; and determining, at the first device, a lowest cost among a plurality of costs, wherein the plurality of costs includes at least (i) a cost associated with the first sub-optimal allocation of time slots and (ii) a cost associated with the second sub-optimal allocation of time slots, wherein determining the allocation of time slots according to an optimizing algorithm includes determining the allocation of time slots based on at least (i) the plurality of resource requests, (ii) the plurality of estimated link capacities, and (iii) the lowest cost.

The method further includes determining the time slots within the first time interval based on at least the plurality of estimated link capacities.

In still another embodiment, a device comprises: a network interface configured to receive, from other devices of a plurality of devices coupled to a network, a plurality of resource requests and a plurality of estimated link capacities, wherein each of the plurality of resource requests is indicative of a requested data rate for a different one of a plurality of communication links, and wherein each of the plurality of communication links is associated with a respective one of devices within the plurality of devices, and wherein each of the plurality of estimated link capacities is indicative of an available data rate for the different ones of the plurality of communication links; and a scheduling unit configured to determine, based on at least (i) the plurality of resource requests, (ii) the plurality of estimated link capacities, and (iii) a cost associated with a sub-optimal allocation of time slots within a first time interval, an allocation of time slots within the first time interval according to an optimizing algorithm while accounting for overhead associated with data communicated on the plurality of communication links, wherein the allocation of time slots reserves different segments of the first time interval for use by different communication links of the plurality of communication links, and cause at least some of the other devices of the plurality of devices to communicate via the plurality of communication links according to the determined allocation of time slots.

In other embodiments, the device includes any suitable combination of one or more of the following features.

The scheduling unit is configured to determine the allocation of time slots according to a branch and bound algorithm.

The scheduling unit is configured to use the cost associated with the sub-optimal allocation of time slots as an upper bound on costs of solutions provided by the branch and bound algorithm.

The scheduling unit is further configured to: determine the sub-optimal allocation of time slots according to a heuristic algorithm; and cause at least some of the other devices of the plurality of devices to communicate according to the determined sub-optimal allocation of time slots until after the scheduling unit determines the allocation of time slots within the first time interval according to the optimizing algorithm.

The scheduling unit is further configured to: determine a first sub-optimal allocation of time slots according to a first heuristic algorithm, wherein the first sub-optimal allocation of time slots reserves different segments of the first time interval for use by different communication links of the plurality of communication links; determine a second sub-optimal allocation of time slots according to a second heuristic algorithm different from the first heuristic algorithm, wherein the second sub-optimal allocation of time slots reserves different segments of the first time interval for use by different communication links of the plurality of communication links; and determine a lowest cost among a plurality of costs, wherein the plurality of costs includes at least (i) a cost associated with the first sub-optimal allocation of time slots and (ii) a cost associated with the second sub-optimal allocation of time slots, wherein the scheduling unit is configured to determine the allocation of time slots according to the optimizing algorithm based on at least (i) the plurality of resource requests, (ii) the plurality of estimated link capacities, and (iii) the lowest cost.

Various devices described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable medium or media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Where the elements of embodiments of the invention are implemented using a processor executing software and/or firmware instructions, such software instructions may be written with any suitable programming or scripting language such as C, C++, JAVA®, assembler, or the like, with the various algorithms being implemented with any suitable combination of data structures, objects, processes, routines or other programming elements. Functional aspects may be implemented in algorithms that execute on one or more processors.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

What is claimed is:

1. A method, implemented in a first device of a plurality of devices coupled to a network, of allocating resources, the method comprising:
    receiving, at the first device and from other devices of the plurality of devices, a plurality of resource requests, wherein each of the plurality of resource requests is indicative of a requested data rate for a different one of a plurality of communication links, and wherein each of the plurality of communication links is associated with a respective pair of devices within the plurality of devices;
    receiving, at the first device and from the other devices of the plurality of devices, a plurality of estimated link capacities, wherein each of the plurality of estimated link capacities is indicative of an available data rate for the corresponding communication link of the plurality of communication links when the corresponding communication link is the only communication link of the plurality of communication links that is active;
    determining, at the first device and based on at least the plurality of resource requests and the plurality of estimated link capacities, an allocation of time slots within a first time interval according to a branch and bound algorithm, wherein the allocation of time slots reserves different segments of the first time interval for future use by different communication links of the plurality of communication links such that only one communication link of the plurality of communication links is active during a given time slot; and
    causing at least some of the other devices of the plurality of devices to communicate via the plurality of communication links according to the determined allocation of time slots.

2. The method of claim 1, further comprising:
    determining, at the first device and based on at least the plurality of resource requests and the plurality of estimated link capacities, a first sub-optimal allocation of time slots within the first time interval according to a first heuristic algorithm, wherein the first sub-optimal allocation of time slots reserves different segments of the first time interval for use by different communication links of the plurality of communication links; and
    determining, at the first device, a cost associated with the first sub-optimal allocation of time slots,
    wherein determining the allocation of time slots according to the branch and bound algorithm includes determining the allocation of times slots based on at least (i) the plurality of resource requests, (ii) the plurality of estimated link capacities, and (iii) the cost associated with the first sub-optimal allocation of time slots.

3. The method of claim 2, wherein determining a cost associated with the first sub-optimal allocation of time slots includes determining an amount of reserved time that will be used in the first time interval if the first sub-optimal allocation of time slots is used.

4. The method of claim 2, wherein determining the allocation of times slots according to the branch and bound algorithm includes using the cost associated with the first sub-optimal allocation of time slots as an upper bound on costs of solutions provided by the branch and bound algorithm.

5. The method of claim 2, further comprising:
    determining, at the first device and based on at least the plurality of resource requests and the plurality of estimated link capacities, a second sub-optimal allocation of time slots within the first time interval according to a second heuristic algorithm different from the first heuristic algorithm, wherein the second sub-optimal allocation of time slots reserves different segments of the first time interval for use by different communication links of the plurality of communication links;
    determining, at the first device, a cost associated with the second sub-optimal allocation of time slots; and
    determining, at the first device, a lowest cost among a plurality of costs, wherein the plurality of costs includes at least (i) the cost associated with the first sub-optimal allocation of time slots and (ii) the cost associated with the second sub-optimal allocation of time slots,
    wherein determining the allocation of time slots according to the branch and bound algorithm includes determining the allocation of times slots based on at least (i) the plurality of resource requests, (ii) the plurality of estimated link capacities, and (iii) the determined lowest cost.

6. The method of claim 2, further comprising:
    causing at least some of the other devices of the plurality of devices to communicate according to the determined first sub-optimal allocation of time slots at least until the allocation of time slots according to the branch and bound algorithm has been determined.

7. The method of claim 1, wherein causing at least some of the other devices to communicate according to the determined allocation of time slots includes sending one or more scheduling messages to at least some of the other devices of the plurality of devices.

8. The method of claim 1, wherein determining the allocation of time slots within the first time interval according to the branch and bound algorithm includes optimally determining the allocation of time slots within the first time interval while accounting for overhead associated with data communicated on the plurality of communication links.

9. The method of claim 1, further comprising:
determining respective durations of the time slots within the first time interval based on at least the plurality of estimated link capacities.

10. The method of claim 9, wherein causing at least some of the other devices to communicate according to the determined allocation of time slots includes sending one or more scheduling messages to at least some of the other devices of the plurality of devices.

11. The method of claim 9, wherein determining the allocation of time slots within the first time interval according to the branch and bound algorithm includes optimally determining the allocation of time slots within the first time interval while accounting for transmission overhead associated with data communicated on the plurality of communication links.

12. A device comprising:
a network interface configured to receive, from other devices of a plurality of devices coupled to a network, a plurality of resource requests and a plurality of estimated link capacities, wherein each of the plurality of resource requests is indicative of a requested data rate for a different one of a plurality of communication links, and wherein each of the plurality of communication links is associated with a respective pair of devices within the plurality of devices, and wherein each of the plurality of estimated link capacities is indicative of an available data rate for the corresponding communication link of the plurality of communication links when the corresponding communication link is the only communication link of the plurality of communication links that is active; and
a scheduling unit configured to
determine, based on at least the plurality of resource requests and the plurality of estimated link capacities, an allocation of time slots within a first time interval according to a branch and bound algorithm, wherein the allocation of time slots reserves different segments of the first time interval for future use by different communication links of the plurality of communication links such that only one communication link of the plurality of communication links is active during a given time slot, and
cause at least some of the other devices of the plurality of devices to communicate via the plurality of communication links according to the determined allocation of time slots.

13. The device of claim 12, wherein:
the scheduling unit is further configured to
determine, based on at least the plurality of resource requests and the plurality of estimated link capacities, a first sub-optimal allocation of time slots within the first time interval according to a first heuristic algorithm, wherein the first sub-optimal allocation of time slots reserves different segments of the first time interval for use by different communication links of the plurality of communication links, and
determine a cost associated with the first sub-optimal allocation of time slots; and
the scheduling unit is configured to determine the allocation of time slots according to the branch and bound algorithm based on at least (i) the plurality of resource requests, (ii) the plurality of estimated link capacities, and (iii) the cost associated with the first sub-optimal allocation of time slots.

14. The device of claim 13, wherein the scheduling unit is configured to determine the allocation of times slots at least by using the cost associated with the first sub-optimal allocation of time slots as an upper bound on costs of solutions provided by the branch and bound algorithm.

15. The device of claim 13, wherein:
the scheduling unit is further configured to
determine, based on at least the plurality of resource requests and the plurality of estimated link capacities, a second sub-optimal allocation of time slots within the first time interval according to a second heuristic algorithm different from the first heuristic algorithm, wherein the second sub-optimal allocation of time slots reserves different segments of the first time interval for use by different communication links of the plurality of communication links,
determine a cost associated with the second sub-optimal allocation of time slots, and
determine a lowest cost among a plurality of costs, wherein the plurality of costs includes at least (i) the cost associated with the first sub-optimal allocation of time slots and (ii) the cost associated with the second sub-optimal allocation of time slots; and
the scheduling unit is configured to determine the allocation of time slots according to the branch and bound algorithm based on at least (i) the plurality of resource requests, (ii) the plurality of estimated link capacities, and (iii) the determined lowest cost.

16. The device of claim 12, wherein the scheduling unit is configured to cause at least some of the other devices to communicate according to the determined allocation of time slots at least by causing the network interface to send one or more scheduling messages to at least some of the other devices of the plurality of devices.

* * * * *